Sept. 21, 1937. W. H. BASELT 2,093,796
CLASP BRAKE
Filed Dec. 30, 1933 2 Sheets-Sheet 1
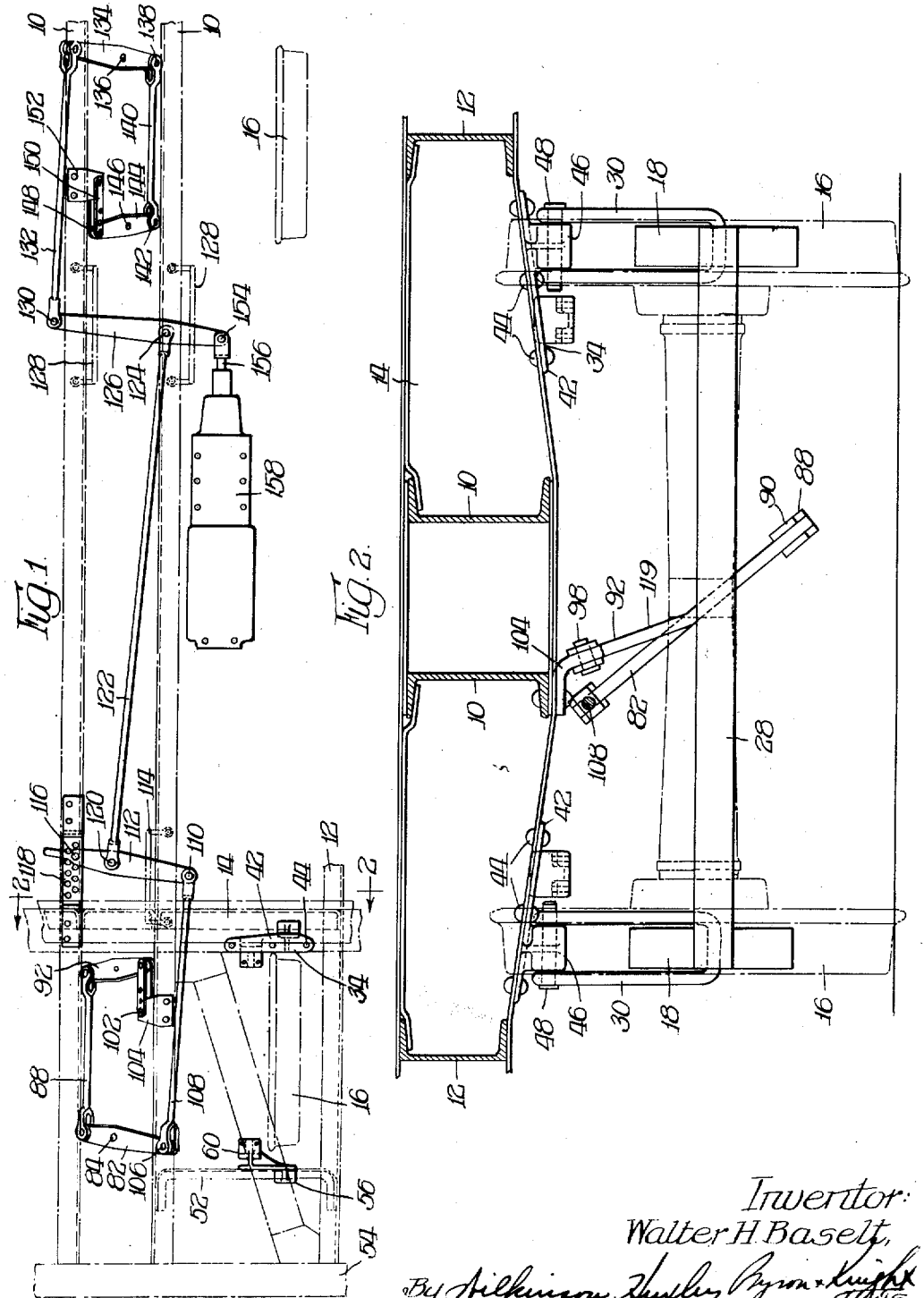
Inventor:
Walter H. Baselt,
By Wilkinson, Huxley, Byron & Knight
attys

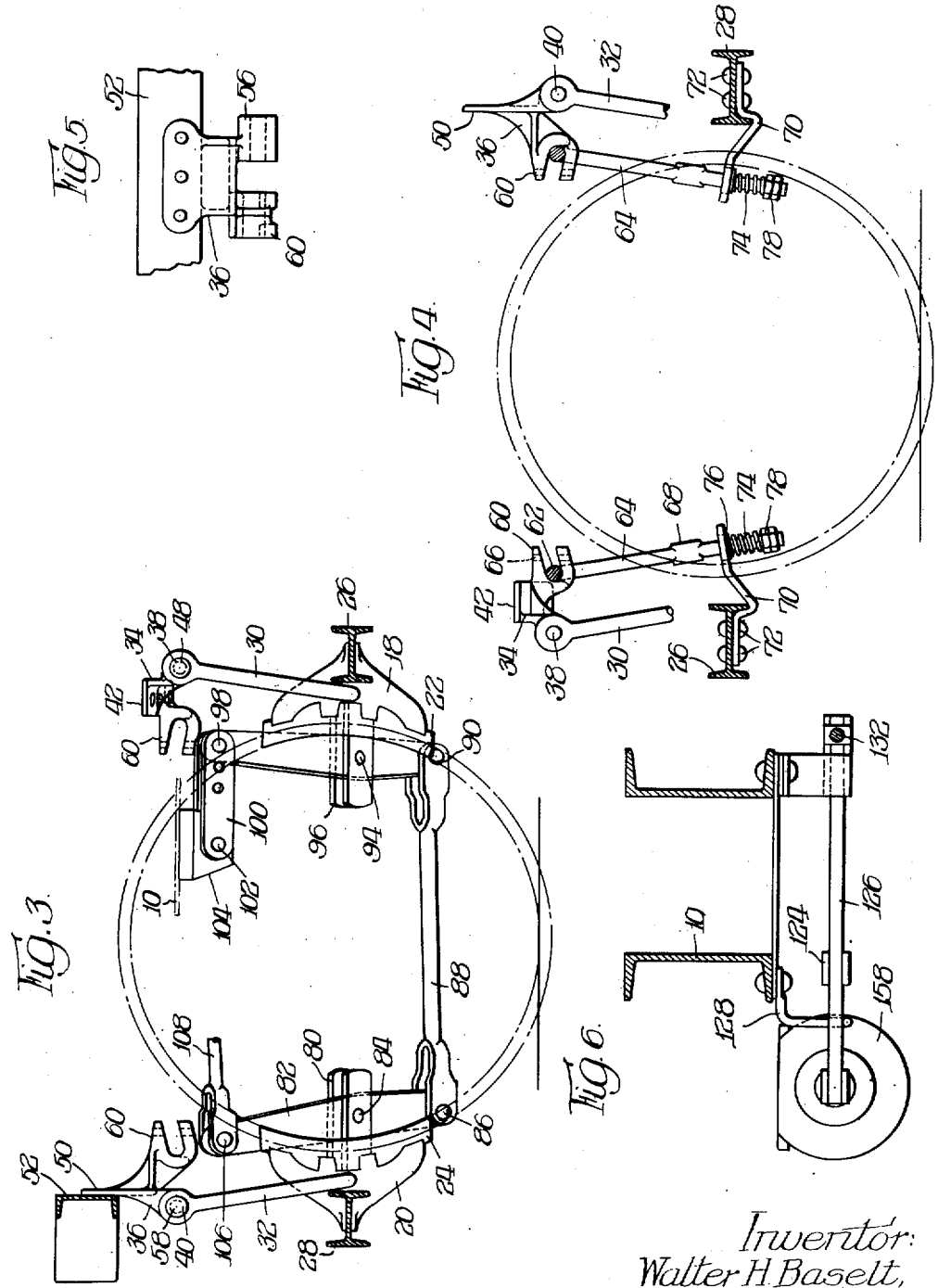

Patented Sept. 21, 1937

2,093,796

UNITED STATES PATENT OFFICE 2,093,796

CLASP BRAKE

Walter H. Baselt, Chicago, Ill., assignor to American Steel Foundries, Chicago, Ill., a corporation of New Jersey Application December 30, 1933, Serial No. 704,645

6 Claims. (Cl. 188—56)

This invention pertains to brake rigging, and more particularly to a clasp brake for a four-wheel truck vehicle.

It is an object of this invention to provide a brake arrangement adapted particularly for use in a four-wheel car.

Another object is to provide a brake arrangement carried on the car body of a four-wheel car.

Yet another object is to provide a clasp brake arrangement adapted to be supported on a car body, said brake arrangement having fourth point supports or safety hangers.

A further object is to provide a piston operated brake arrangement for a four-wheel car wherein the brakes are supported directly on the car body.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of a four-wheel car underframe showing the application of the brake arrangement thereto;

Figure 2 is an enlarged transverse sectional elevation taken substantially in the plane as indicated by the line 2—2 of Figure 1;

Figure 3 is a fragmentary side elevation showing the application of the brake rigging to one wheel of the vehicle illustrated in Figure 1;

Figure 4 is an elevation of the fourth-point support and safety hanger for the brake arrangement illustrated in Figure 1;

Figure 5 is an enlarged side elevation of one of the brake hanger and safety support brackets showing its application to a portion of the car body;

Figure 6 is a transverse sectional elevation through the center sills of the car body shown in Figure 1, showing the brake cylinder.

The vehicle construction illustrated is adapted particularly for a four-wheel car wherein the spaced center sills 10 are connected to the side sills 12 by means of the transverse supporting member 14, a bolster being located at each end of the car adjacent the wheel and axle assemblies 16. Brake heads 18 and 20 provided with the brake shoes 22 and 24 are disposed on the opposite sides of each wheel, brake heads on opposite sides of the car being connected by means of the brake beams 26 and 28, shown as of I-beam construction.

The brake heads are pivotally supported on the car body by means of the brake hangers 30 and 32 pivoted to said brake heads, the brake hangers being U-shaped and pivoted to the inner and outer brackets 34 and 36 as at 38 and 40. The inner brackets 34 are provided with the securing web 42 adapted to be secured to the supporting member by means of the rivets 44, said supporting member having the bearing 46 for the reception of the pin 48 constituting the pivotal connection 38.

The bracket 36 is provided with the upstanding web 50 adapted to be secured to the beam 52 connecting the center and side sills disposed between the supporting member and the end sills 54, said end sills being connected to the side and center sills. The bracket 36 is provided with the bearing 56 for the reception of the pin 58 constituting the pivotal connection 40. Each of the brackets is provided with the U-shaped jaws 60 adapted to receive the T-head 62 of the fourth-point support and safety hanger 64. This safety hanger is substantially the construction illustrated in applicant's co-pending application filed of even date.

The jaws 60 are provided with suitable apertures 66 for the reception of securing means such as a cotter for retaining the T-head in position in the bracket. The shank of the fourth point support is provided with the flat portion 68 adapted to be inserted through the U-shaped jaws of the brake beam brackets 70 secured by means of the rivets 72 to the brake beams 26 and 28. The spring 74 is interposed between the washer 76 which is preferably provided with the rounded bearing portion contacting the bracket 70, the lower end of the spring being seated on the retaining nuts 78.

The outer brake beam 28 is provided with the fulcrum 80 to which the live brake lever 82 is pivoted intermediate the ends thereof as at 84, the lower end of said live brake lever being pivotally connected as at 86 to the outer end of the pull rod 88, the other end of the pull rod 88 being pivotally connected as at 90 to the lower end of the dead brake lever 92. The dead brake lever 92 is pivotally connected intermediate the ends thereof as at 94 to the fulcrum 96 provided on the inner brake beam 26.

The upper end of the dead brake lever is pivotally and adjustably connected as at 98 to the strap 100 which in turn is pivotally connected as at 102 to the bracket 104 carried by one of the center sills 10. The upper end of the live truck lever is pivotally connected as at 106 to the outer end of the pull rod 108. The inner end of said pull rod 108 is pivotally connected as at 110 to one end of the dead cylinder or body lever 112, said cylinder lever being supported by means of the cylinder lever support 114 secured to the center sills 10. The other end of the dead cylinder lever is adjustably pivoted as at 116 to the slack adjuster 118. Due to the disposition of the live and dead truck levers and the dead cylinder lever, the upper end of the dead truck lever is offset as at 119 for connection to the strap 100 and to permit free passage of the pull rod 108.

The dead cylinder lever is pivotally connected intermediate the ends thereof to the pull rod 122, the other end of which is pivotally connected as at 124 to the live cylinder lever 126 carried by the cylinder lever supports 128 disposed on the center sills. One end of the live cylinder lever 126 is pivotally connected as at 130 to the pull rod 132 which corresponds to the pull rod 108 and is connected to the live brake lever 134 which is similar to the brake lever 82 at the opposite end of the car. The brake riggings at both ends of the car are similar, the live truck lever 134 being pivotally connected as at 136 to a fulcrum carried by an associated brake beam (not shown) similar to the brake beam 28. The lower end of the live brake lever is pivotally connected as at 138 to the pull rod 140 which in turn is pivotally connected as at 142 to the dead brake lever 144. The dead brake lever 144 is similar to the dead brake lever 92, being pivotally connected as at 146 to a suitable fulcrum lever carried by the associated brake beam which is similar to the brake beam 26. The upper end of the dead truck lever is offset and is pivotally and adjustably connected as at 148 to the strap 150, which in turn is pivotally connected to the bracket 152 secured to the center sills 10. The other end of the live cylinder lever 126 is pivotally connected as at 154 to the piston 156 of the operating cylinder 158 which is secured to the car body.

In the operation of the brake rigging, movement of the piston 156 toward the right as viewed in Figure 1 causes the live cylinder lever 126 to be moved outwardly, fulcruming about the pivotal connection 124 to move the pull rod 132 toward the left, or in counter-clockwise direction around the pivot 124 to thereby operate the brakes at the right end of the car as viewed in Figure 1, by moving the live brake lever 134 in a counter-clockwise direction around the fulcrum 136 to cause the pull rod 140 to move the dead brake lever 144 in a counter-clockwise direction to thereby set the brake shoes.

The live cylinder lever will at the same time pivot about the fulcrum 130 to cause the pull rod 122 to be moved toward the right about the fulcrum 130. Movement of the pull rod 122 will cause movement of the dead cylinder lever 112 around the fulcrum 116 to exert a pull on the pull rod 108 toward the right as viewed in Figure 1. Movement of the pull rod 108 will cause the brake shoe 24 to engage the associated wheel whereby continued movement of the brake lever 82 will cause a pull on the pull rod 88 to set the brake shoe 22.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on one of the brake beams for each of the wheel and axle assemblies, a dead brake lever pivotally mounted on the car body and pivotally connected to the other of the brake beams for each of the wheel and axle assemblies and the adjacent live brake lever, and an operating cylinder carried by said car body, the piston of said cylinder being operatively connected to each of said live brake levers.

2. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally mounted on the car body and pivotally connected to each of the inside brake beams and the adjacent live brake lever, and an operating cylinder carried by said car body, the piston of said cylinder being operatively connected to each of said live brake levers.

3. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally mounted on each of said center sills and pivotally connected to each of the inside brake beams and the adjacent live brake lever, and an operating cylinder carried by said car body, the piston of said cylinder being operatively connected to each of said live brake levers.

4. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally connected to each of the inside brake beams and the adjacent lever, an operating cylinder carried by said car body, and mechanism connected to the piston of said cylinder for operating said live brake levers, said mechanism including pull rods connected to said live brake levers, said live and dead levers being angularly disposed and said dead levers having a portion substantially in the same plane as said live levers but being offset therefrom and being pivotally mounted on said center sills at said offset portions to provide clearance for said pull rods.

5. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally connected to each of the inside brake beams and the adjacent live brake lever, an operating cylinder carried by said car body, and mechanism connected to the piston of said cylinder for operating said live brake levers, said mechanism including pull rods connected to said live brake levers, said dead brake levers being pivotally mounted on said center sill in offset relation to said live brake levers to provide clearance for said pull rods.

6. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally connected to each of the inside brake beams and the adjacent live brake lever, an operating cylinder carried by said car body, operating mechanism between said cylinder and live brake levers, said mechanism including a live lever mounted on said center sills and connected to the piston of said cylinder, a dead lever mounted on said center sills and pivotally connected to one of said center sills and interconnected with said live lever, and pull rods connected to said dead and live operating levers and to said live brake levers, said dead brake levers being pivotally mounted on said center sill in offset relation to said live brake levers to provide clearance for said pull rods.

WALTER H. BASELT.

CERTIFICATE OF CORRECTION.

Patent No. 2,093,796.   September 21, 1937.

WALTER H. BASELT.

It is hereby certified that error appears in the printed specification of the above numbered patent requiring correction as follows: Page 1, first column, line 50, for the word "bolster" read supporting member; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.

lever pivotally mounted on each of said center sills and pivotally connected to each of the inside brake beams and the adjacent live brake lever, and an operating cylinder carried by said car body, the piston of said cylinder being operatively connected to each of said live brake levers.

4. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally connected to each of the inside brake beams and the adjacent lever, an operating cylinder carried by said car body, and mechanism connected to the piston of said cylinder for operating said live brake levers, said mechanism including pull rods connected to said live brake levers, said live and dead levers being angularly disposed and said dead levers having a portion substantially in the same plane as said live levers but being offset therefrom and being pivotally mounted on said center sills at said offset portions to provide clearance for said pull rods.

5. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally connected to each of the inside brake beams and the adjacent live brake lever, an operating cylinder carried by said car body, and mechanism connected to the piston of said cylinder for operating said live brake levers, said mechanism including pull rods connected to said live brake levers, said dead brake levers being pivotally mounted on said center sill in offset relation to said live brake levers to provide clearance for said pull rods.

6. In a four wheel car, the combination of a car body having side and end sills, center sills extending between said end sills, transverse supporting members spaced from said end sills and extending between said side sills, beam members disposed between said transverse supporting members and end sills and extending between the side sills and the center sills, a wheel and axle assembly at each end of said car body disposed adjacent each of said transverse supporting members, brake heads disposed on each side of each wheel, brake hangers pivotally connected to said brake heads, said brake hangers on one side of the wheels being pivoted to said beam members and on the other side pivoted to said transverse supporting members, brake beams connecting brake heads on opposite sides of said car body, a live brake lever pivotally mounted on each of the outside brake beams, a dead brake lever pivotally connected to each of the inside brake beams and the adjacent live brake lever, an operating cylinder carried by said car body, operating mechanism between said cylinder and live brake levers, said mechanism including a live lever mounted on said center sills and connected to the piston of said cylinder, a dead lever mounted on said center sills and pivotally connected to one of said center sills and interconnected with said live lever, and pull rods connected to said dead and live operating levers and to said live brake levers, said dead brake levers being pivotally mounted on said center sill in offset relation to said live brake levers to provide clearance for said pull rods.

WALTER H. BASELT.

CERTIFICATE OF CORRECTION.

Patent No. 2,093,796.                      September 21, 1937.

WALTER H. BASELT.

It is hereby certified that error appears in the printed specification of the above numbered patent requiring correction as follows: Page 1, first column, line 50, for the word "bolster" read supporting member; and that the said Letters Patent should be read with this correction therein that the same may conform to the record of the case in the Patent Office.

Signed and sealed this 16th day of November, A. D. 1937.

(Seal)                                         Henry Van Arsdale,
                                               Acting Commissioner of Patents.

CERTIFICATE OF CORRECTION.

Patent No. 2,093,796. September 21, 1937.

WALTER H. BASELT.

It is hereby certified that error appears in the printed specification of the above numbered patent requiring correction as follows: Page 1, first column, line 50, for the word "bolster" read supporting member; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.